(12) United States Patent
Wolf et al.

(10) Patent No.: US 7,565,507 B2
(45) Date of Patent: Jul. 21, 2009

(54) COOPERATIVE MEMORY MANAGEMENT ALLOWING PROGRAM REQUEST AND RELEASE MEMORY AS NEEDED

(75) Inventors: Michael A. Wolf, San Francisco, CA (US); Gil Tene, San Carlos, CA (US); Luca Andrea Castellano, Mountain View, CA (US)

(73) Assignee: Azul Systems, Inc., Mountain View, CA (US)

( * ) Notice: Subject to any disclaimer, the term of this patent is extended or adjusted under 35 U.S.C. 154(b) by 0 days.

(21) Appl. No.: 11/894,434

(22) Filed: Aug. 20, 2007

(65) Prior Publication Data

US 2007/0294501 A1    Dec. 20, 2007

Related U.S. Application Data

(63) Continuation of application No. 10/816,471, filed on Apr. 1, 2004, now Pat. No. 7,278,005.

(51) Int. Cl.
*G06F 12/00* (2006.01)
(52) U.S. Cl. .................. 711/170; 707/205; 707/206
(58) Field of Classification Search ................ 711/170, 711/171, 172; 707/205, 206
See application file for complete search history.

(56) References Cited

U.S. PATENT DOCUMENTS

2004/0060041 A1 *   3/2004   Demsey et al. .............. 717/151

* cited by examiner

*Primary Examiner*—Pierre-Michel Bataille
(74) *Attorney, Agent, or Firm*—Van Pelt, Yi & James LLP

(57) ABSTRACT

A computer system includes a memory and a processor coupled with the memory, configured to assign to each of a plurality of processes a corresponding amount of committed memory from a memory pool, the memory pool including committed memory and uncommitted memory; and dynamically allocate an additional amount of memory required by one of the plurality of processes from the uncommitted memory in the memory pool.

Managing memory includes assigning to each of a plurality of processes a corresponding amount of committed memory from a memory pool, the memory pool including committed memory and uncommitted memory; and dynamically allocating an additional amount of memory required by one of the plurality of processes from the uncommitted memory in the memory pool.

19 Claims, 13 Drawing Sheets

COOPERATIVE MEMORY MANAGEMENT ALLOWING PROGRAM REQUEST AND RELEASE MEMORY AS NEEDED

CROSS REFERENCE TO OTHER APPLICATIONS

This application is a continuation of U.S. patent application Ser. No. 10/816,471, entitled COOPERATIVE MEMORY MANAGEMENT filed Apr. 1, 2004 now U.S. Pat. No. 7,278,005 which is incorporated herein by reference for all purposes.

BACKGROUND OF THE INVENTION

Efficient memory management is important for efficient execution of computer programs. Some environments leave the memory management to the programs, allowing programs to request and release memory as needed. Such programs are error-prone since they typically dependent on the programmer to manually determine the request and release of memory. In some garbage-collected environments, garbage collectors automatically release memory occupied by objects that are no longer in use, thereby improving the reliability of the programs' memory management.

FIG. 1 is a diagram illustrating the memory allocation of processes operating in a garbage-collected environment. In this example, system 120 assigns memory to processes such as 100-106 when the processes are initialized. In the example shown, the memory assigned to process 100 includes a committed section 110 and headroom 112. The committed section provides memory required to run the process. The amount of memory assigned to the committed section is represented as x. To achieve efficient collection of dead objects, garbage collection algorithms generally require a significant quantity of memory ("headroom") beyond what is needed to contain the set of live objects. The headroom provides free memory to the process. Over time, some of the objects allocated in the headroom may be no longer used by the process. The garbage collector eventually frees these obsolete objects to make more free memory available. The headroom is typically assigned more memory than the committed section. In this example, the amount of memory assigned to the headroom is 5 times the amount of committed memory, denoted as 5×.

While the memory management method described above is useful for garbage-collected environments, several problems remain. Since the amount of headroom assigned to each process is typically determined before the process is launched, the process occupies the same amount of memory whether it is busy or idle. On a system with many running processes, there may be a few processes that utilize a significant portion of their headroom, while the majority of the processes stay idle and much of the free memory in their headroom remains unused. Thus, the memory in the system is not efficiently utilized. Also, systems implementing such a memory management scheme tend not to have good resiliency. If the memory demand of a process exceeds what is allocated (for example, due to unpredicted high peak demand or memory leaks), the process may crash. Additionally, such systems may have unpredictable behavior. For example, in some systems, other operations of the system are paused when the garbage collector is performing garbage collection. The pausing behavior is unpredictable and undesirable. In some systems, a concurrent garbage collector is used to ameliorate the pausing problem. However, when the rate of garbage generation is high, or when collection heuristics fail, the concurrent garbage collector still may be unable to prevent the system from pausing.

It would be desirable to implement memory management while avoiding pauses due to garbage collecting and offering better predictability. It would also be desirable to provide better resiliency and increase memory efficiency.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various aspects of managing memory are disclosed below. In some embodiments, a memory pool is maintained. Memory is allocated from the pool to processes based on priority information of the requests. Processes that previously obtained memory from the memory pool may receive requests to release memory into the memory pool. In some embodiments, status information is received from processes and used to assist in memory management functions, including determining whether/when to collect memory from processes, determining the urgency and/or priority of memory requests from processes, etc.

Figure 2:
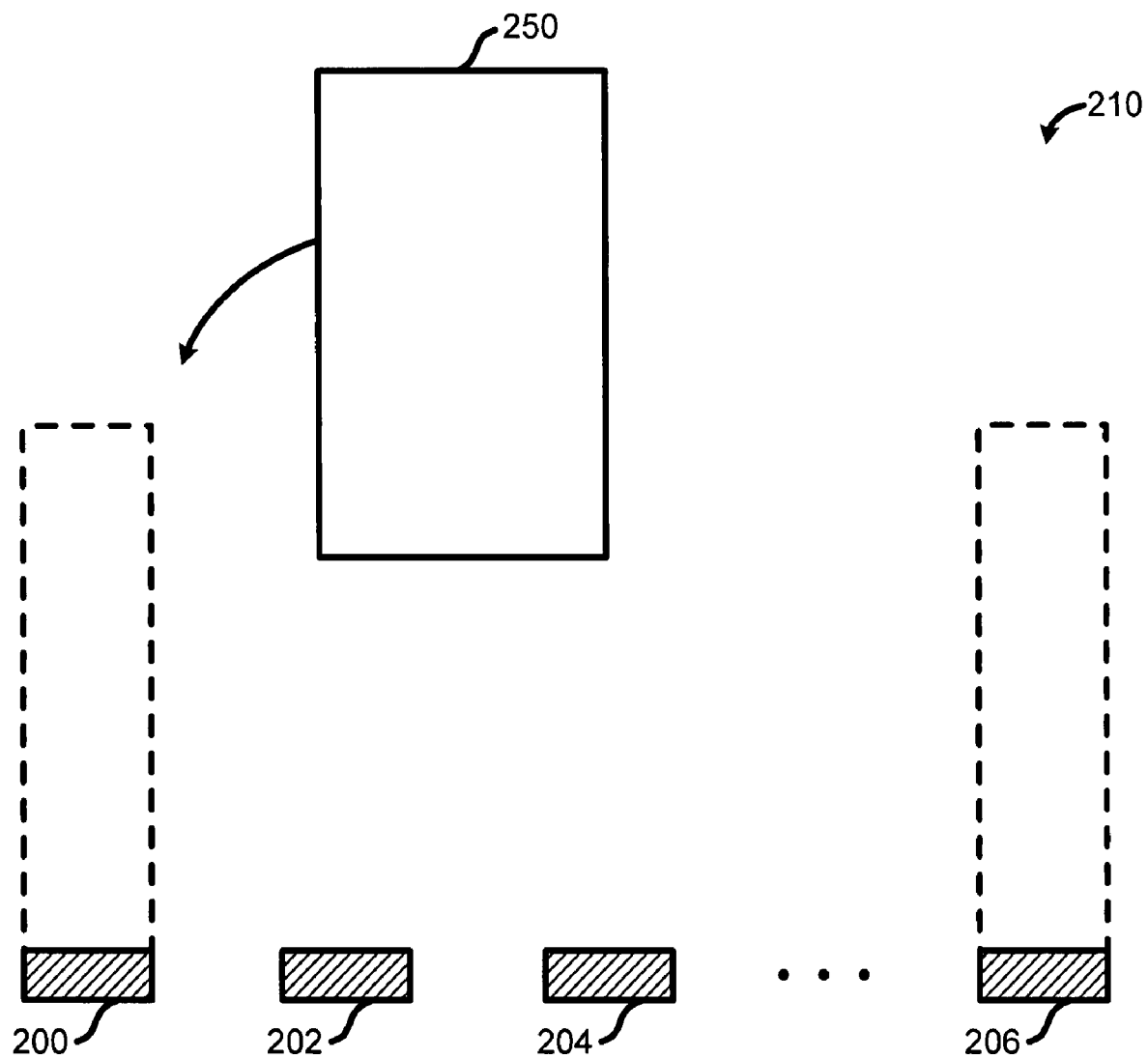
FIG. 2 is a diagram illustrating the memory allocation of processes in an environment according to one embodiment.

FIG. 2 is a diagram illustrating the memory allocation of processes in an environment according to one embodiment. In this example, there are several processes executing in system 210. As used herein, a process refers to a set of programming instructions that are executed, including a program, a program module, an instance of a program or program module, etc. A process may be implemented in any appropriate manner, including being embedded in a chip or being loaded into memory or firmware. In some embodiments, the environment in which the processes operate is a garbage collected environment such as Java, Microsoft .NET, etc.

Figure 1:
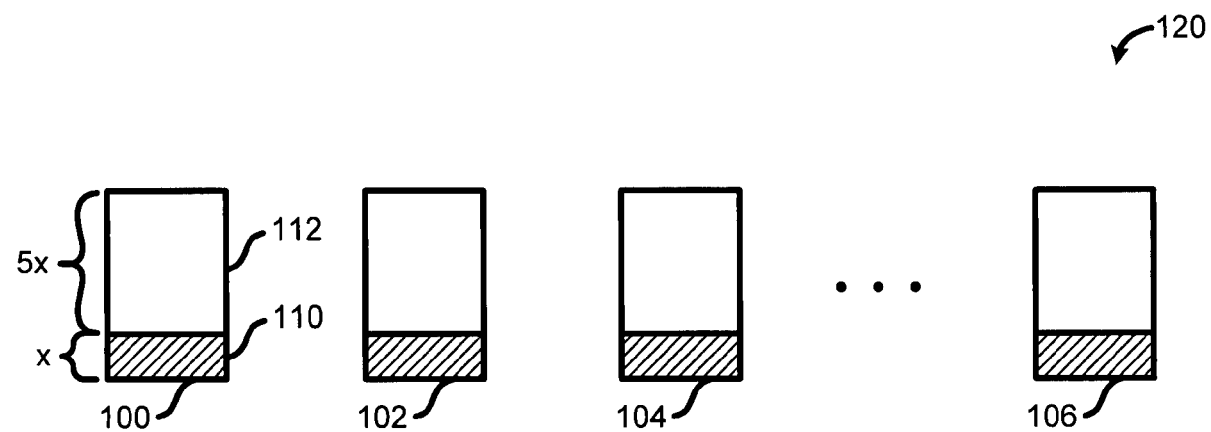
FIG. 1 is a diagram illustrating the memory allocation of processes operating in a garbage-collected environment.

Processes 200-206 are each assigned a committed section of memory. A memory pool 250 is shared among the processes. A memory pool refers to a set of memory that can be shared among different processes. The memory in the pool may be contiguous or discontiguous. More than a single pool may be used. In some embodiments, the memory pool includes memory held in reserve that is not owned by any particular process. In some embodiments, the memory pool includes memory owned by processes that can become available upon request (also referred to as "freeable memory"), such as memory used by the processes to store obsolete objects. In some embodiments, the processes in the system cooperate to retrieve memory from the pool as needed and to return free memory to the pool. In some embodiments, the status of the memory in the pool is tracked so that memory that is already in use is distinguishable from memory that is not in use. The cooperative memory management scheme allows memory to be dynamically assigned to processes experiencing high memory demand. The size of the memory pool may be smaller than the overall headroom required by systems that do not employ the cooperative memory management scheme. For example, in a system such as system 120 of FIG. 1, if each process requires 5× of headroom, the headroom required for 10 processes is then 50×. In system 210, since the processes may share memory in memory pool 250, the memory pool may include 20× of memory and still satisfy the requirements of 10 processes. Alternatively, the memory pool may distribute more headroom memory to processes requesting memory. For example, memory pool may include 50× of memory, and each process requesting memory may receive 10× of memory instead of 5×, thus improving the performance of the processes. Details of cooperative memory management are discussed below.

Figure 3:
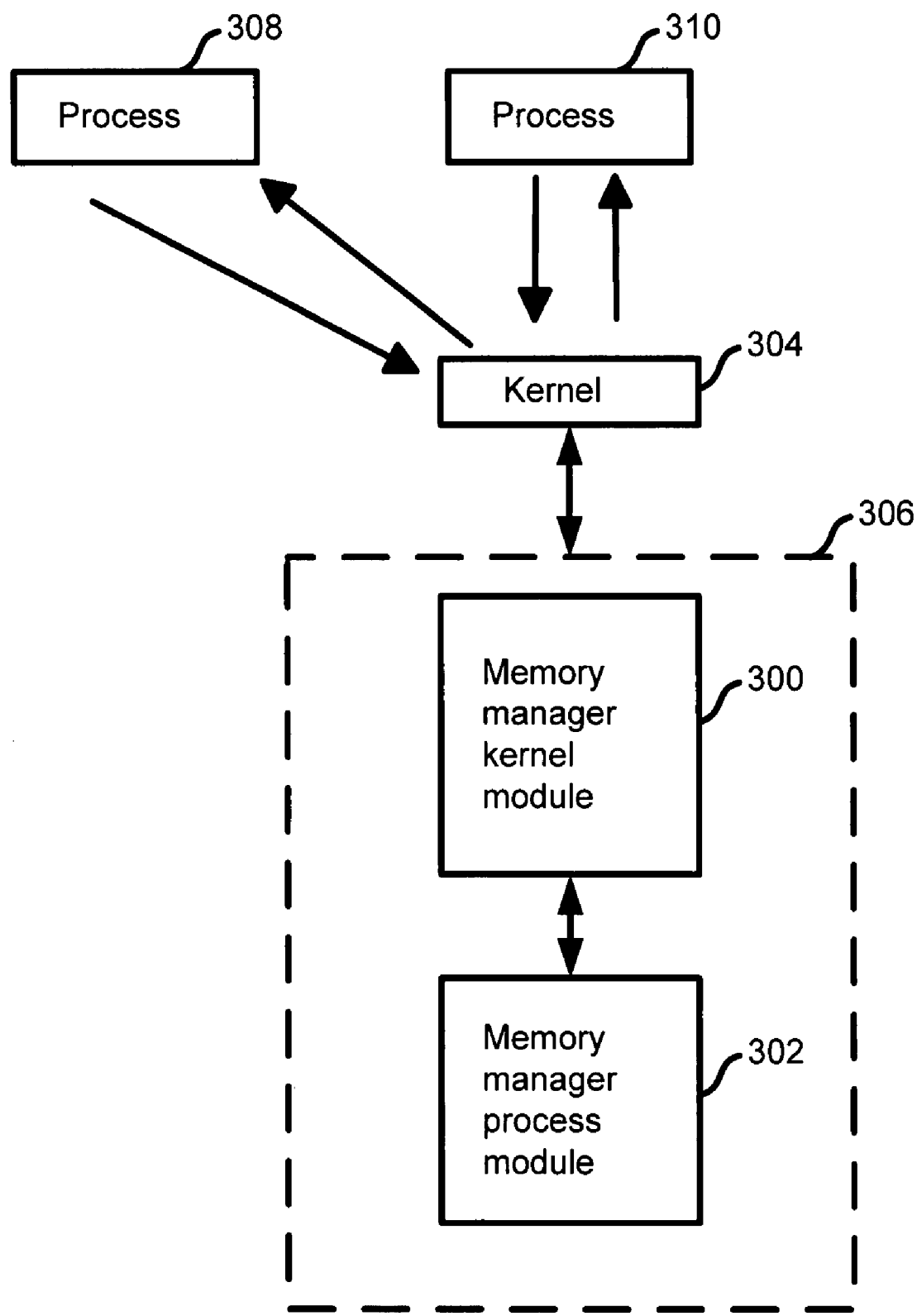
FIG. 3 is a diagram illustrating a cooperative memory management system according to one embodiment.

FIG. 3 is a diagram illustrating a cooperative memory management system according to one embodiment. In this example, memory requests, status reports and any other appropriate information associated with user processes 308 and 310 are sent to a kernel (or operating system) 304 via system calls. The system calls are forwarded to a memory manager 306. Memory manager 306 includes a memory manager kernel module 300 that communicates with kernel 304 and a memory manager process module 302 that allocates or collect memory based on the system calls received. Requests and responses from the memory manager to the processes, including requests for status reports, responses to memory requests from the processes, etc., are sent using signals via the kernel. In some embodiments, the memory manager modules are combined into one module. In some embodiments, the memory manager is incorporated into the kernel. In some embodiments, the memory manager operates in the user space and communicates with the processes via inter-process communication protocols. This type of memory manager may operate on a system without requiring changes to the existing kernel or operating system.

Figure 4:
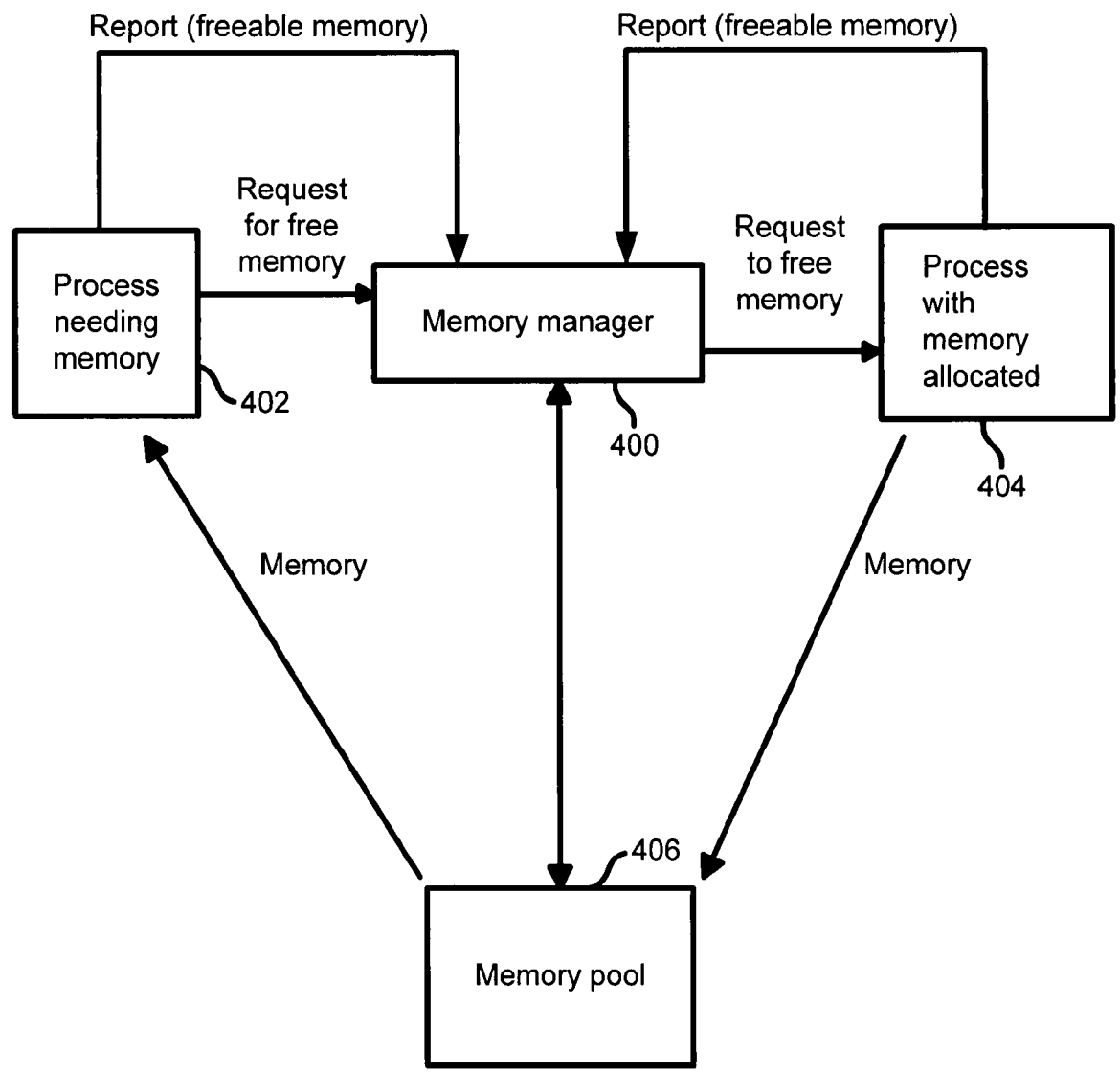
FIG. 4 is a diagram illustrating a cooperative memory environment according to one embodiment.

FIG. 4 is a diagram illustrating a cooperative memory environment according to one embodiment. In this example, memory manager 400 manages a memory pool 406. There are multiple processes running in the system. Two processes 402 and 404 are shown in the diagram. Process 402 is shown to be in need of additional memory. Process 404 is shown to occupy memory allocated from the memory pool. Sometimes a process that already has allocated memory may require additional memory. In this example, process 402 sends a request for additional memory to memory manager 400, which then assigns memory from memory pool 406 to process 402.

To ensure that there is sufficient free memory available in the pool for successive memory requests, the size of the pool should be kept in balance. To replenish free memory in the memory pool, memory manager 400 sends a collection request to a process, such as process 404, that previously received memory from the pool. The collection request indicates to the process that it should free up some memory and return it to the pool. The memory manager may initiate such a request after allocating memory from the pool to a process. It may also schedule the request periodically to collect free memory from processes. Upon receiving the collection request, the process performs garbage collection to release obsolete objects and returns the freed memory to the pool. In some embodiments, the processes voluntarily return memory into the pool without requiring collection requests from the memory manager.

In this example, a process also reports its status information to the memory manager. The status information may be sent by the process automatically, or upon receiving a request for status information from the memory manager. In some embodiments, the status information is sent along with the process's request for additional memory. This status information may include the efficiency of the process's garbage collector, how much freeable memory is owned by the process, or any other information useful for managing the process's memory in a collaborative environment. The memory manager uses the status information to determine when/whether to reclaim memory from the processes, what type of memory to assign to a process, or make any other policy decisions.

Figure 5:
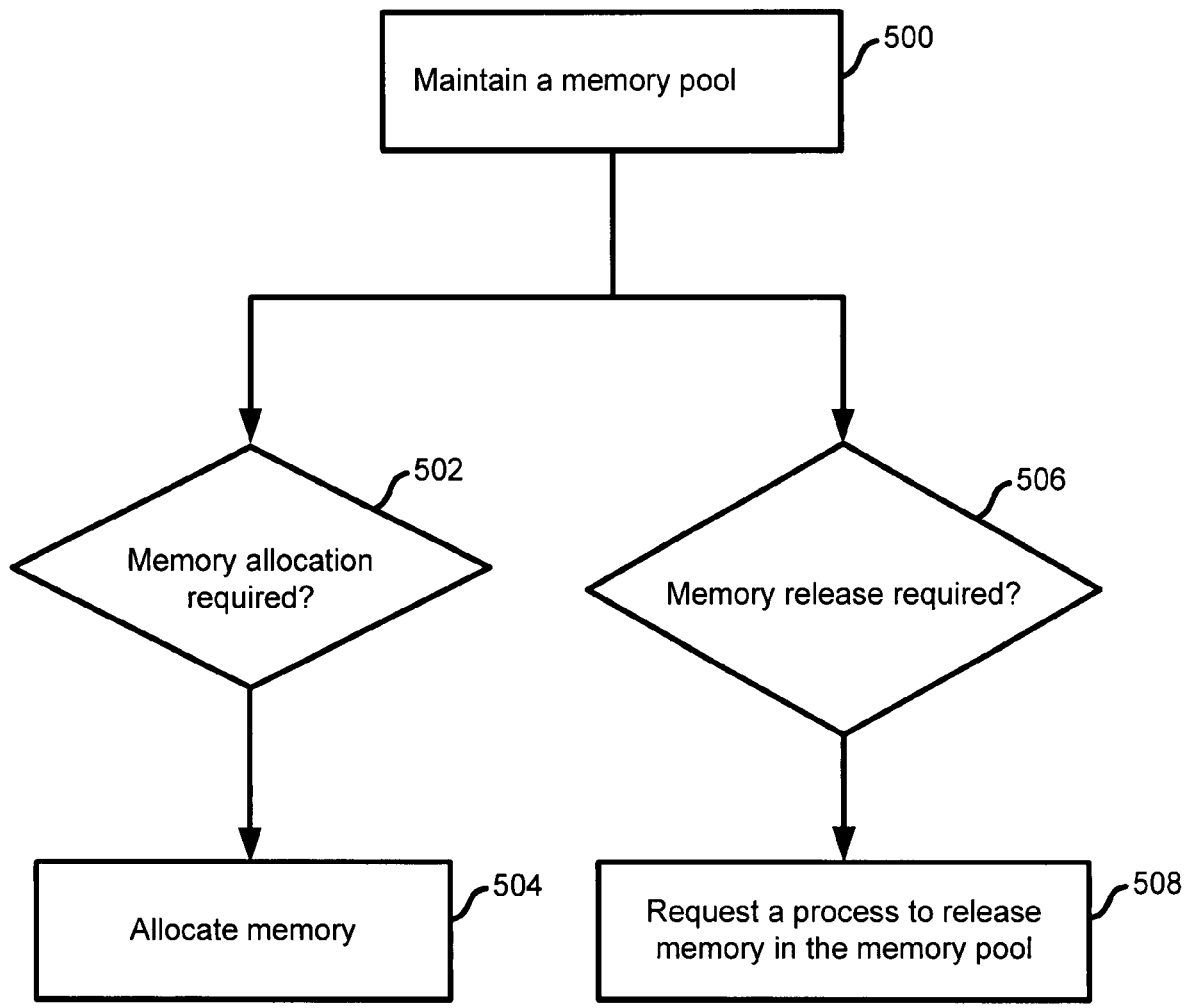
FIG. 5 is a flowchart illustrating the operations of a memory manager according to one embodiment.

FIG. 5 is a flowchart illustrating the operations of a memory manager according to one embodiment. In this example, the memory manager maintains a memory pool (500). If it is determined that a portion of the memory pool is required for allocation (502), the memory manager attempts to allocate the memory (504). In some embodiments, it is determined that memory is required for allocation when the memory manager receives a memory request from a process. In some embodiments, the determination is made by monitoring various aspects of the processes. If a process appears to be low in memory (for example, if the rate of garbage collection or other appropriated performance metric falls below a predetermined level), a memory request is then made for the process.

If it is determined that memory should be released into the pool (506), the memory manager makes a request to a process to release memory (508). In some embodiments, the memory manager monitors the size of the memory pool and requests for memory release when the size of the memory pool falls below a certain level. In some embodiments, the memory manager examines the status of the processes to determine whether a memory release request should be made, and/or selects an appropriate memory-releasing process. The amount of freeable memory available, and the effects of releasing memory on the operations of the process are some of the factors taken into consideration.

Figure 6:
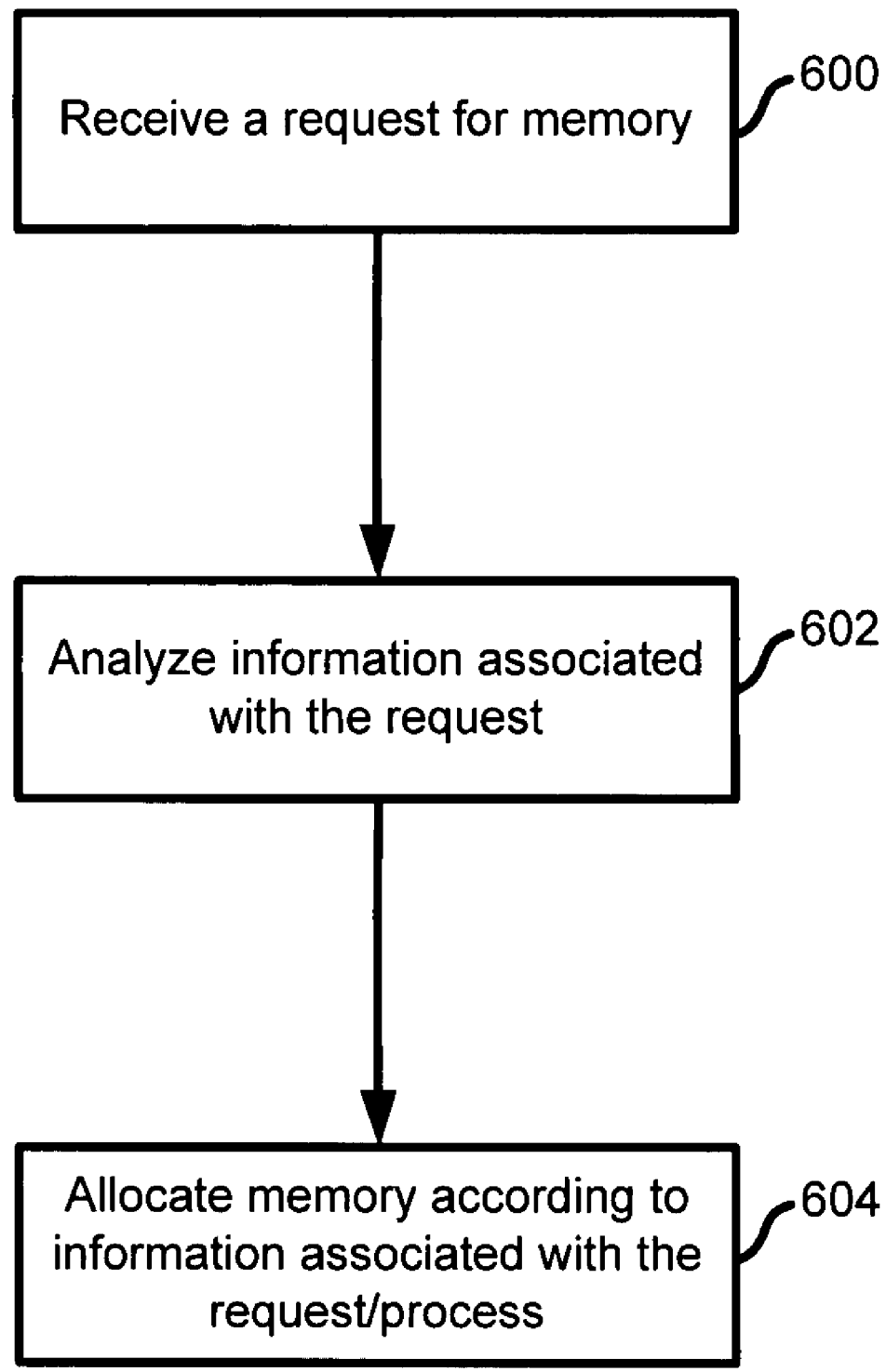
FIG. 6 is a flowchart illustrating memory allocation by the memory manager according to one embodiment.

FIG. 6 is a flowchart illustrating memory allocation by the memory manager according to one embodiment. In this example, a request for additional memory is received (600). The request indicates the amount of memory requested and the reason for the request. There are several reasons for a process to request memory. For example, a process that is running out of memory may require a boost in free memory to avoid crashing. A process may require some memory for its garbage collector to operate and free up more memory. A process may also require more memory to increase its efficiency. Different information may be included in the request in various embodiments. For example, the request may include an urgency level instead of a reason for the request.

Information associated with the request is then analyzed (602). In some embodiments, in addition to the information included in the request, status information associated with the process making the request is also analyzed. Memory is then allocated accordingly (604). Details of the memory allocation are discussed below.

Figure 7A:
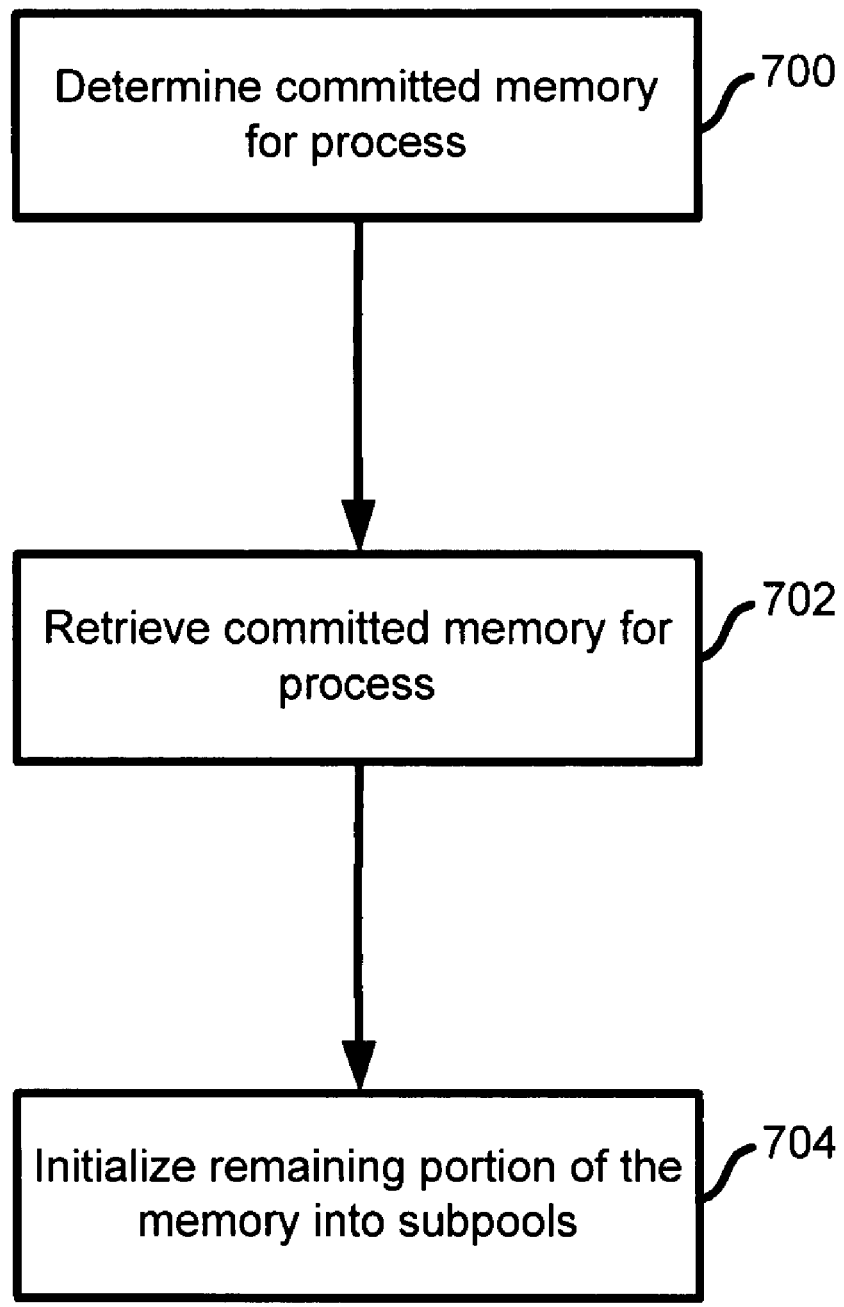
FIG. 7A is a diagram illustrating the initialization of a memory pool according to one embodiment.

FIG. 7A is a diagram illustrating the initialization of a memory pool according to one embodiment. In this example, the committed memory used by processes in the system is first determined (700). The committed memory is used to fulfill the basic memory requirements of the processes, such as memory used to run the program code, store global objects or variables, etc. In some embodiments, the amount of memory designated as committed memory is determined by the user. The memory manager determines the appropriate amount of committed memory by reading a configuration file or receiving a user input. The committed memory is then retrieved for processes that are being launched (702). The remaining portion of the memory pool is then initialized into subpools (704).

Figure 7B:
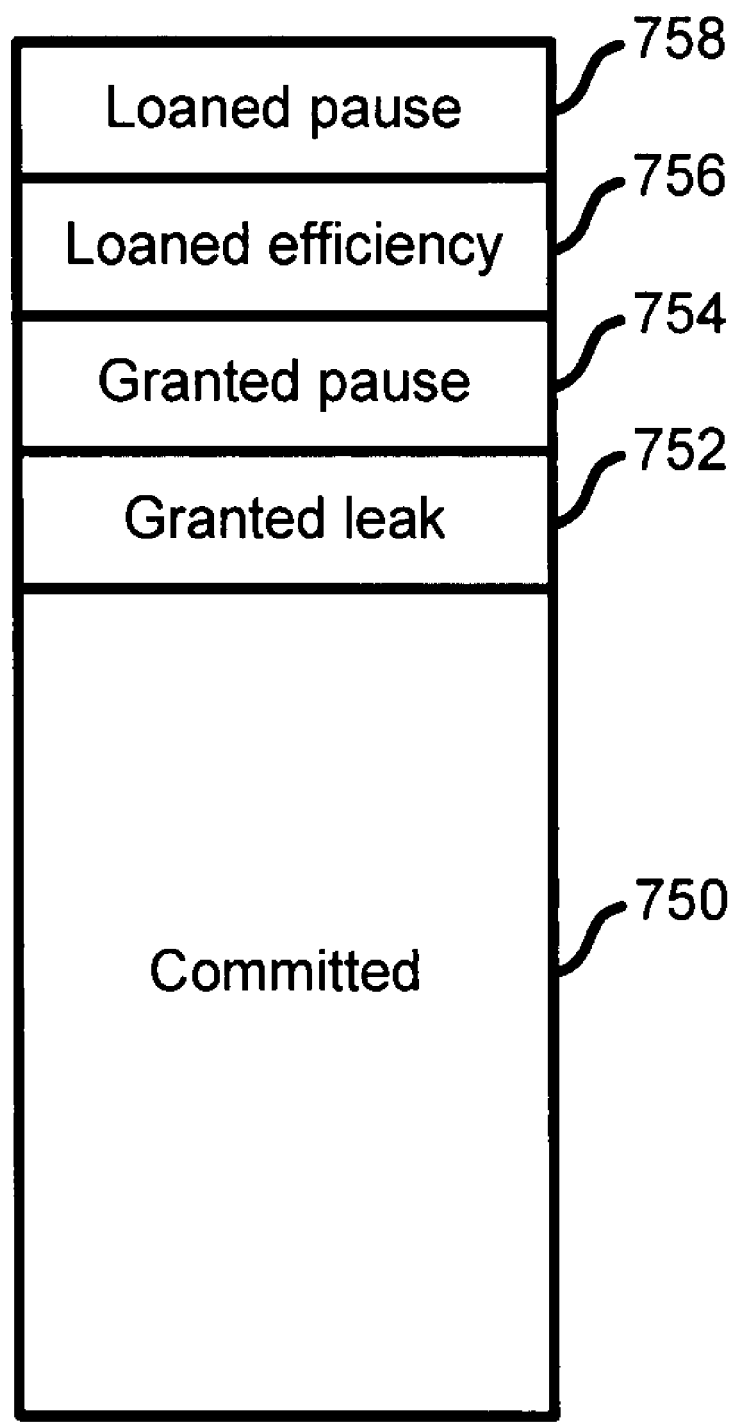
FIG. 7B is a diagram illustrating the structure of a memory pool after initialization, according to one embodiment.

FIG. 7B is a diagram illustrating the structure of a memory pool after initialization, according to one embodiment. In this example, the memory pool includes a committed memory section 750. The rest of the memory pool is divided into four subpools: a granted leak (GL) pool 752, a granted pause (GP) pool 754, a loaned efficiency (LE) pool 756 and a loaned pause (LP) pool 758. Other pool arrangements can be used in other embodiments. For example, in some embodiments, the loaned pools are not present.

The loaned pools are used to allocate memory for processes that have sufficient freeable memory (also referred to as memory collateral) to replenish the memory they are requesting from the pool. As used herein, memory collateral refers to memory that has been identified as not being in used by the process. Collateral memory may not be immediately available. For example, in some embodiments, a garbage collection is preferably completed before memory occupied by garbage becomes available. Memory collateral can be used to secure a loan from the memory pool. For example, a process may have 200 MB of memory used by obsolete objects; however, the process may require an additional 50 MB of memory in order to efficiently execute the garbage collection algorithm. Since the collateral of the process exceeds the memory requested by the process, it is likely that the process is able to return to the memory pool at least as much memory as it obtains with the current request. In this example, processes requesting memory to operate more efficiently are allocated memory from the LE pool. Processes requesting memory for more urgent reasons (e.g., the process is going to pause due to insufficient memory) are assigned memory from the LP pool.

The granted pools are used to allocate memory for processes that do not have sufficient memory collateral to replace the memory they request. Memory assigned to such a process is more similar to a grant than a loan because there is no guarantee that the process will eventually return as much memory to the pool. Processes requesting memory due to potential memory leaks are allocated memory from the GL pool. Processes requesting memory for more urgent reasons (e.g., the process is going to pause due to insufficient memory) are assigned memory from the GP pool.

Figure 8:
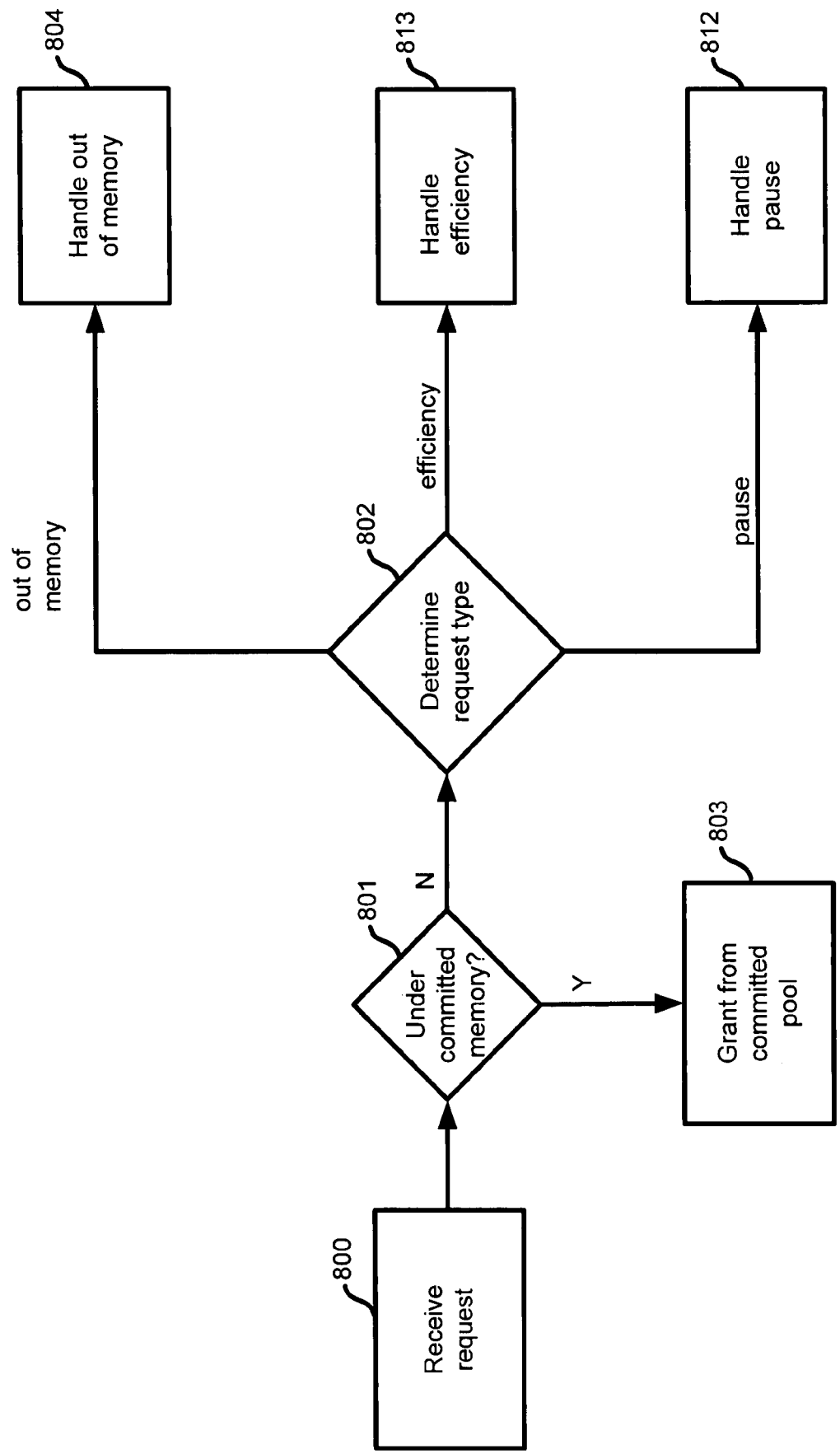
FIG. 8 is a flowchart illustrating the processing of a request for memory.

FIG. 8 is a flowchart illustrating the processing of a request for memory. Upon receiving a request for memory (800), it is first determined whether the memory being requested is committed memory (801). If the memory is committed memory, it is then granted from the committed pool (803). If, however, the memory is not committed memory, the type of request is then determined (802).

In this embodiment, the request includes a request urgency level used to determine the types of memory requests and how the request is handled. A request with a high urgency level should be given priority, and be assigned memory from a pool that is less likely to be empty. The most urgent type of request is by a process that is running out of memory. An out-of-memory request is handled in 804, which is discussed in detail in FIG. 11. A slightly less urgent type of request is by a process indicating that its garbage collection may cause the system to pause. A pause request is handled in 812, which is discussed in detail in FIG. 9. A request made to increase the efficiency of the process is usually less urgent than the out of memory or pause requests. An efficiency request is handled in 813, which is discussed in detail in FIG. 10.

Figure 9:
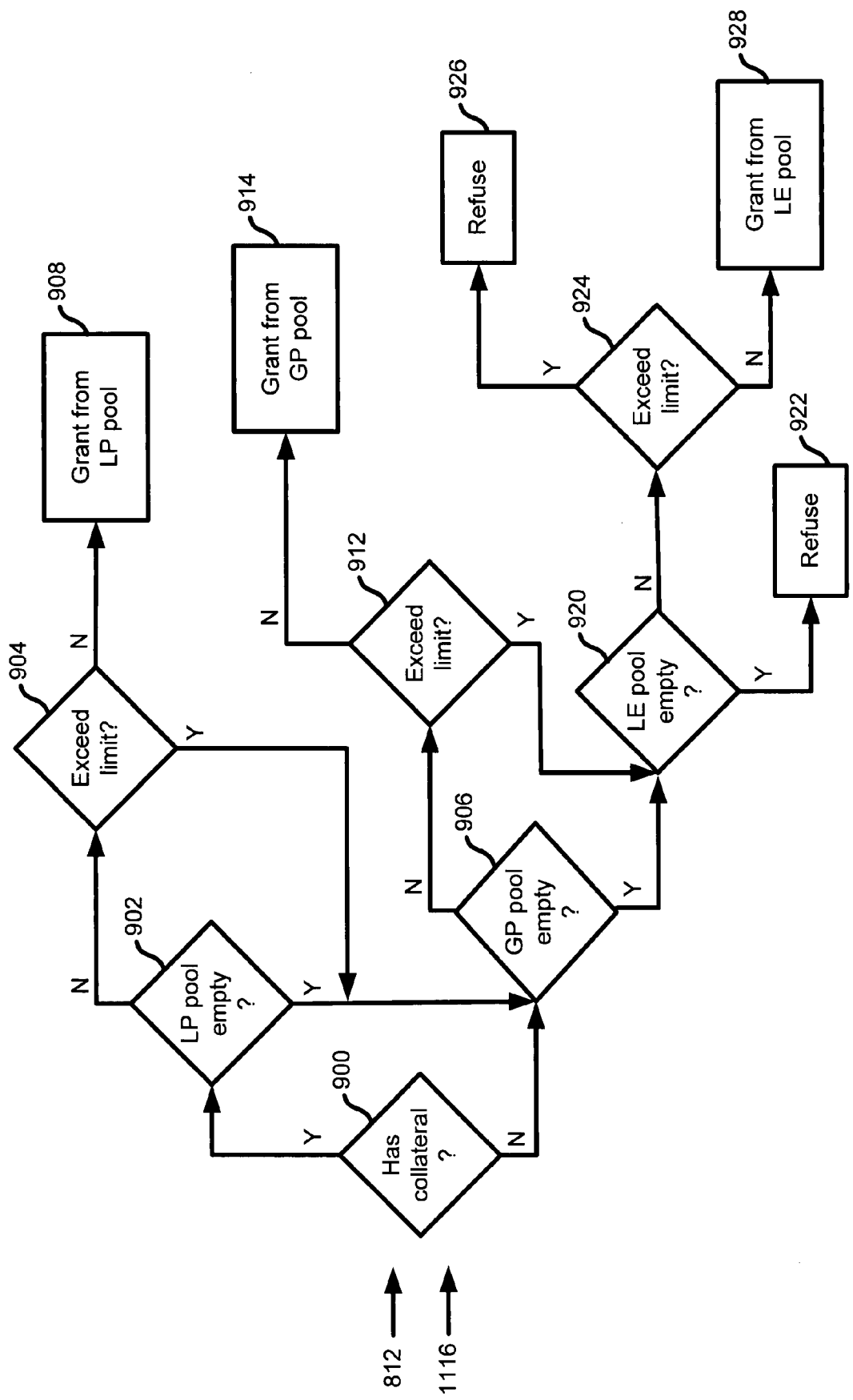
FIG. 9 is a flowchart illustrating the details of handling a pause request according to one embodiment.

FIG. 9 is a flowchart illustrating the details of how a pause request is handled according to one embodiment. This process is applicable to 812 of FIG. 8 and 1116 of FIG. 10. In this example, it is first determined whether the process making the request has sufficient memory collateral (900). Preferably, only freeable memory that has not been used previously to secure a loan is usable as collateral. If the process has sufficient memory collateral, it is then determined whether the LP pool is empty (902). If the LP pool is not empty, it is then determined whether the request exceeds the limit of the LP pool (904). In some embodiments, the limit is the amount of memory available in the LP pool. In some embodiments, the limit is a cap restricting how much memory a process may request from the LP pool. If the limit is not exceeded, memory is then allocated for the process from the LP pool (908).

If the process has exceeded its limit from the LP pool, the LP pool is empty, or if the process has no collateral, it is then determined whether the GP pool is empty (906). If the GP pool is not empty, it is then determined whether the request exceeds the limit of the GP pool (912). In this example, the limit may be the amount of memory available in the GP pool or a cap restricting how much memory a process may request from the GP pool. If the request does not exceed the limit, memory is granted to the process from the GP pool (914).

If the process has exceeded its limit from the GP pool, or if the GP pool is empty, it is then determined whether the LE pool is empty (920). If the LE pool is empty, the request of the process is refused (922). If the LE pool is not empty, it is then determined whether the request exceeds the limit of the LE pool (924). In this example, the limit may be the amount of memory available in the LE pool or a cap restricting how much memory a process may request from the LE pool. If the request does not exceed the limit, memory is granted to the process from the LE pool (928). Otherwise, the memory request is refused (926).

Figure 10:
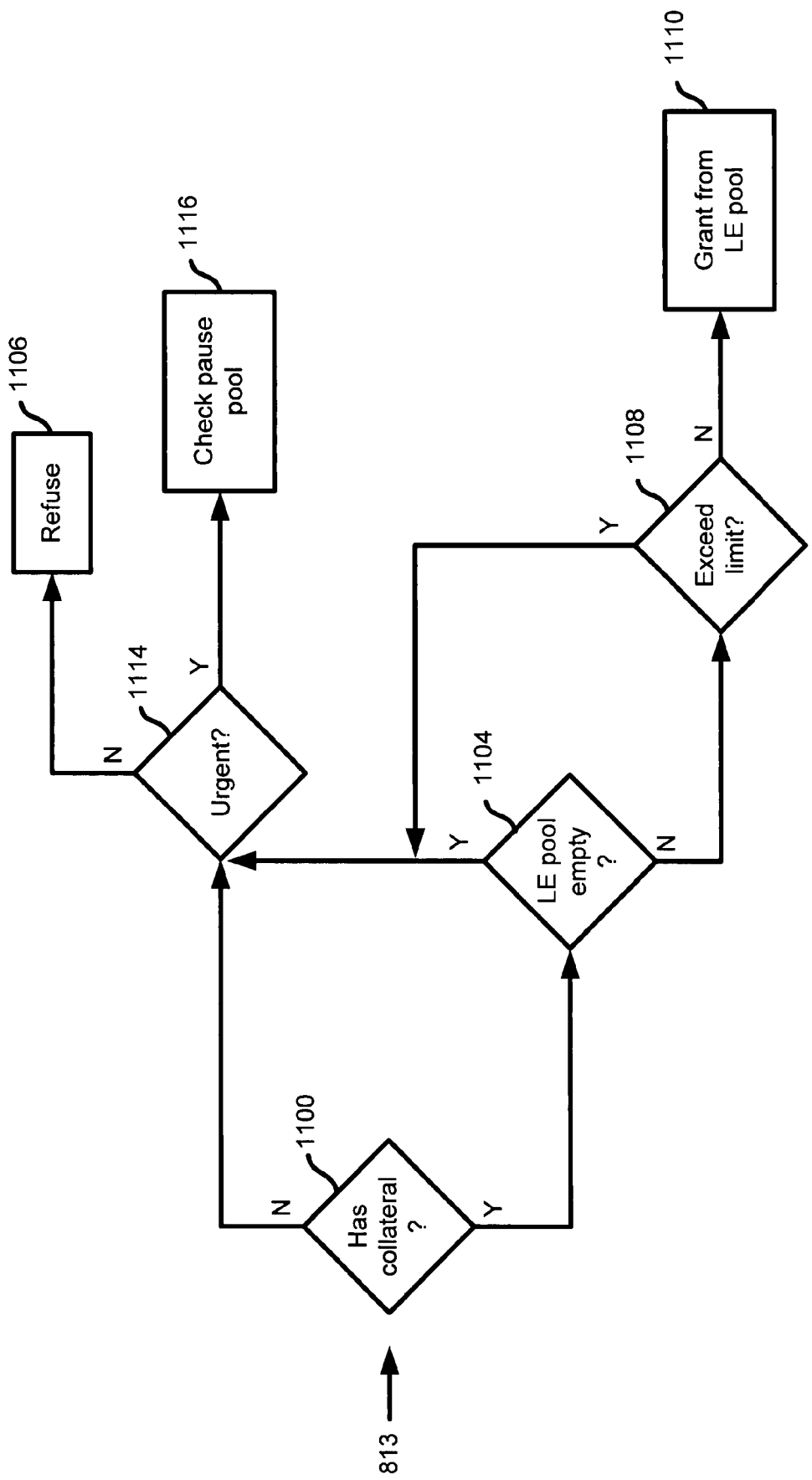
FIG. 10 is a flowchart illustrating the details of handling an efficiency request according to one embodiment.

FIG. 10 is a flowchart illustrating the details of how an efficiency request is handled, according to some embodiments. This process corresponds to 813 of FIG. 8. In this example, it is first determined whether the process making the request has any memory collateral (1100). If the process has memory collateral, it is then determined whether the LE pool is empty (1104). If the LE pool is not empty, it is then determined whether the request exceeds the limit of the LE pool (1108). If the limit is not exceeded, memory is then allocated for the process from the LE pool (1110).

If the process has exceeded its limit from the LE pool, the LE pool is empty, or if the process has no collateral, it is then determined if the efficiency request was marked urgent (1114). Sometimes a process has a severe efficiency problem, and is approaching being paused. In that case, the request for memory is given more consideration in some embodiments. If it was not urgent, the request of the process is refused (1106). If the request was urgent, the memory manager checks to see if the request should be filled via the check for a pause request (1116). In some embodiments, the process of handling the pause request is similar to the process shown in FIG. 9.

Figure 11:
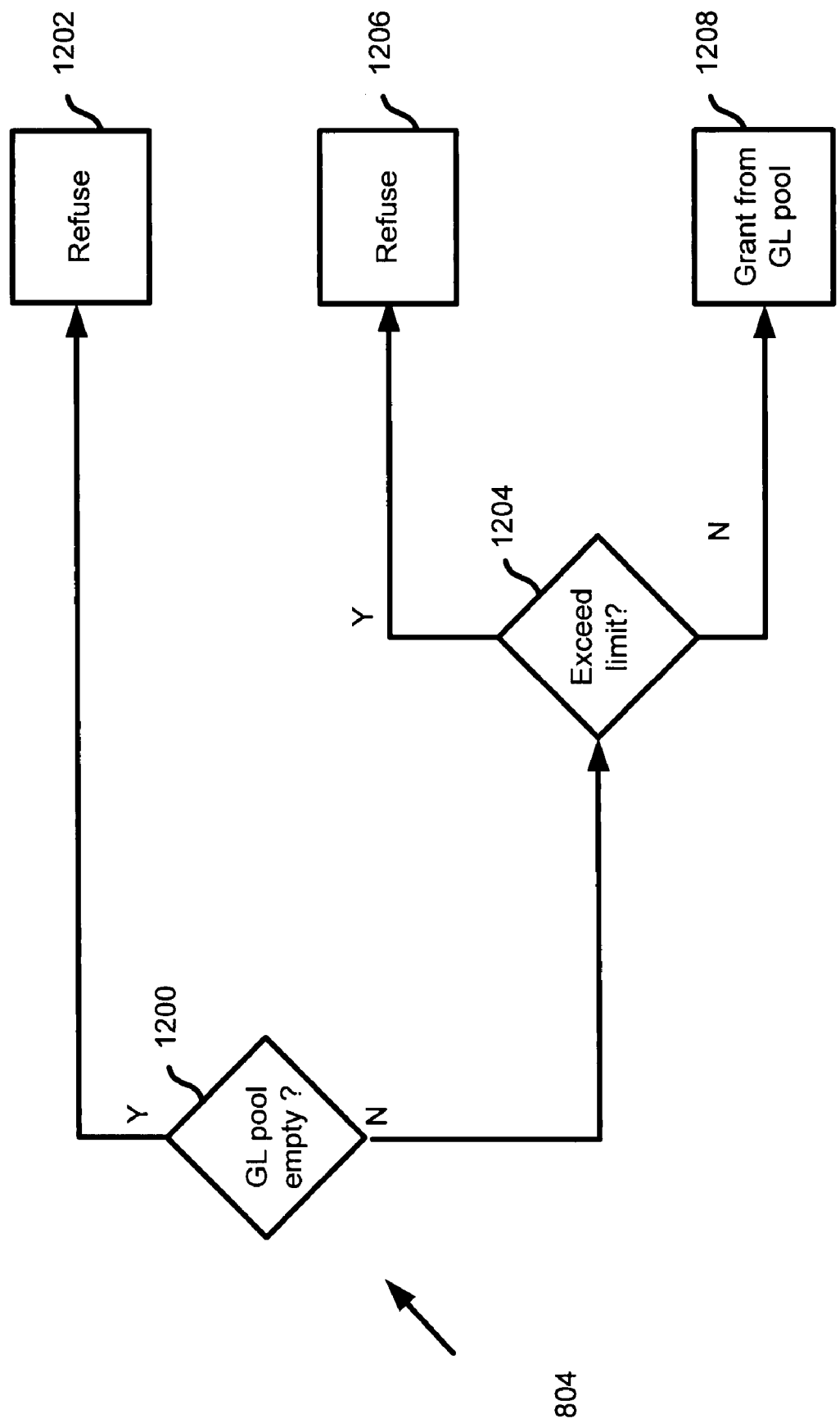
FIG. 11 is a flowchart illustrating the details of handling an out-of-memory request according to one embodiment.

FIG. 11 is a flowchart illustrating the details of handling an out-of-memory request according to some embodiments. This process corresponds to 804 of FIG. 8. Such a request is given the highest priority. Memory allocated to the process is obtained from the GL pool. In this example, it is first determined whether GL pool is empty (1200). If the GL pool is empty, the request is then refused (1202). If, however, the GL pool is not empty, it is then determined whether the request exceeds the limit (1204). If the limit is not exceeded, memory is then allocated for the process from the GL pool (1208); otherwise, the request of the process is refused (1206).

In some embodiments, garbage collection is performed regularly to free unused memory. While it is possible for a process to reuse garbage collected memory directly without cooperating with the memory manager, it is preferable for the process to return the garbage collected memory to the memory manager and then make any request for additional memory. This way, memory that was previously loaned to the process is repaid, and the process is prevented from using up its memory collateral before fulfilling its obligation to return memory to the pool. In some embodiments, the memory manager may communicate loan obligations to a process and allow the process to determine if freed memory can be immediately reused, or if it should be given to the memory manager to return to the pool. In some embodiments, the process keeps track of memory it receives in response to a pause request type and repays such a loan as quickly as possible.

Figure 12:
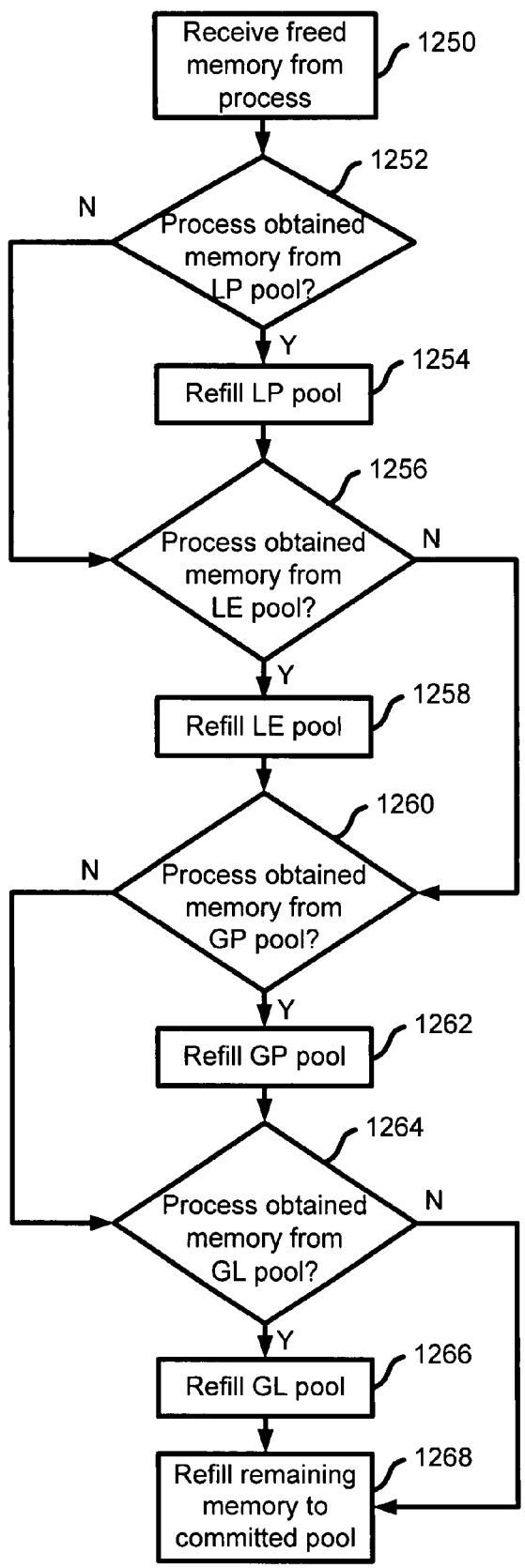
FIG. 12 is a flowchart illustrating how a memory manager refills the memory pool, according to some embodiments.

FIG. 12 is a flowchart illustrating how a memory manager refills the memory pool, according to some embodiments. In some embodiments, when the memory manager allocates memory to a process, it retains a record of how much memory the process has received from each pool. This information is used to facilitate the refill process. In this example, a memory manager receives freed memory from a process (1250). For the purposes of illustration, the total amount of memory freed by the process is denoted as A. It is then determined whether the process received memory from the LP pool (1252). If so, the amount of memory the process obtained from the LP pool is denoted as W. The LP pool is then refilled (1254). In this case, the amount of memory used to filled the LP pool is the lesser of W or A. The amount of memory from A not returned to the LP pool is denoted as B.

After the LP pool is filled, or if the process did not obtain memory from the LP pool, it is determined whether the process received memory from the LE pool (1256). If so, the amount of memory the process obtained from the LE pool is denoted as X. The LE pool is then refill with the lesser of X or B (1258). The amount of memory from B not returned to the LE pool is denoted as C.

After the LE pool is filled, or if the process did not obtain memory from the LE pool, it is determined whether the process received memory from the GP pool (1260). If so, the amount of memory the process obtained from the GP pool is denoted as Y. The GP pool is refill with the lesser of Y or C (1262). The amount of memory from C not returned to the GP pool is denoted as D.

After the GP pool is filled, or if the process did not obtain memory from the GP pool, it is determined whether the process received memory from the GL pool (1264). If so, the amount of memory the process obtained from the GL pool is denoted as Z. The GL pool is refill with the lesser of Z or D (1266).

After the GL pool is filled, or if the process did not obtain memory from the GL pool, the remaining memory not yet returned to the memory pool is used to refill the committed pool (1268).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer system comprising:
   a memory; and
   a processor coupled with the memory, configured to:
   assign to each of a plurality of processes a corresponding amount of committed memory from a memory pool, the memory pooi including committed memory and uncommitted memory;
   dynamically allocate an additional amount of memory required by one of the plurality of processes from the uncommitted memory in the memory pool; and
   determine a memory request urgency level associated with said one of the plurality of processes requiring the additional amount of memory.

2. The system recited in claim 1, wherein the processor is further configured to divide the uncommitted memory into a plurality of subpools.

3. The system recited in claim 2, wherein the processor is further configured to:
   divide the uncommitted memory into a plurality of subpools;
   return memory freed by a memory-freeing process to the memory pool, including by refilling a subpool from which the memory-freeing process had previously received memory.

4. The system recited in claim 2, wherein the plurality of subpools includes a granted subpool.

5. The system recited in claim 2, wherein the plurality of subpools includes a loaned subpool.

6. The system recited in claim 5, wherein each of the loaned subpool requires a memory requesting process to have memory collateral.

7. The system recited in claim 1, wherein the processor is further configured to maintain the memory pool, including by operating a memory manager.

8. The system recited in claim 7, wherein the memory manager is configured to replenish free memory in the memory pool by sending a collection request.

9. The system recited in claim 1, wherein the processor is configured to determine that said one of the plurality of processes requires the additional amount of memory.

10. The system recited in claim 1, wherein the memory request urgency level corresponds to an out-of-memory request.

11. The system recited in claim 1, wherein the memory request urgency level corresponds to a pause request.

12. The system recited in claim 1, wherein the memory request urgency level corresponds to an efficiency request.

13. The system recited in claim 1, wherein the processor is further configured to determine whether said one of the plurality of processes has any memory collateral.

14. The system recited in claim 1, wherein the processor is further configured to return memory freed by a memory-freeing process to the memory pool.

15. A computer system comprising:
a memory: and
a processor coupled with the memory, configured to:
assign to each of a plurality of processes a corresponding amount of committed memory from a memory pool, the memory pool including committed memory and uncommitted memory: and
dynamically allocate an additional amount of memory required by one of the plurality of processes from the uncommitted memory in the memory pool;
divide the uncommitted memory into a plurality of subpools; and
determine a memory request urgency level associated with said one of the plurality of processes requiring the additional amount of memory;
wherein the dynamic allocation of the additional amount of memory includes selecting, based at least in part on the memory request urgency level, an appropriate subpool from the plurality of subpools.

16. A method for managing memory, comprising:
assigning to each of a plurality of processes a corresponding amount of committed memory from a memory pool, the memory pool including committed memory and uncommitted memory;
dynamically allocating an additional amount of memory required by one of the plurality of processes from the uncommitted memory in the memory pool; and
determining a memory request urgency level associated with said one of the plurality of processes requiring the additional amount of memory.

17. A method for managing memory, comprising:
assigning to each of a plurality of processes a corresponding amount of committed memory from a memory pool, the memory pool including committed memory and uncommitted memory;
dynamically allocating an additional amount of memory required by one of the plurality of processes from the uncommitted memory in the memory pool;
dividing the uncommitted memory into a plurality of subpools; and
determining a memory request urgency level associated with said one of the plurality of processes requiring the additional amount of memory; wherein
dynamically allocating the additional amount of memory includes selecting, based at least in part on the memory request urgency level, an appropriate subpool from the plurality of subpools.

18. A computer program product for managing memory, the computer program product being embodied in a computer readable storage medium and comprising computer instructions for:
assigning to each of a plurality of processes a corresponding amount of committed memory from a memory pool, the memory pool including committed memory and uncommitted memory;
dynamically allocating an additional amount of memory required by one of the plurality of processes from the uncommitted memory in the memory pool; and
determining a memory request urgency level associated with said one of the plurality of processes requiring the additional amount of memory.

19. A computer program product for managing memory, the computer program product being embodied in a computer readable storage medium and comprising computer instructions for:
assigning to each of a plurality of processes a corresponding amount of committed memory from a memory pool, the memory pool including committed memory and uncommitted memory;
dynamically allocating an additional amount of memory required by one of the plurality of processes from the uncommitted memory in the memory pool;
dividing the uncommitted memory into a plurality of subpools; and
determining a memory request urgency level associated with said one of the plurality of processes requiring the additional amount of memory; wherein
dynamically allocating the additional amount of memory includes selecting, based at least in part on the memory request urgency level, an appropriate subpool from the plurality of subpools.

* * * * *

UNITED STATES PATENT AND TRADEMARK OFFICE
CERTIFICATE OF CORRECTION

PATENT NO.       : 7,565,507 B2                                Page 1 of 1
APPLICATION NO.  : 11/894434
DATED            : July 21, 2009
INVENTOR(S)      : Wolf et al.

It is certified that error appears in the above-identified patent and that said Letters Patent is hereby corrected as shown below:

Claim 1
Colum 8, line 45 delete "pooi" and insert -- pool --

Signed and Sealed this

Eighth Day of September, 2009

David J. Kappos
*Director of the United States Patent and Trademark Office*